(12) United States Patent
Schmalzrieth et al.

(10) Patent No.: US 10,903,679 B2
(45) Date of Patent: Jan. 26, 2021

(54) MOBILE EMERGENCY CHARGING DEVICE FOR A BATTERY OF A MOTOR VEHICLE, EMERGENCY CHARGING METHOD, AND MOTOR VEHICLE WITH A LIFTING MECHANISM

(71) Applicant: AUDI AG, Ingolstadt (DE)

(72) Inventors: Sven Schmalzrieth, Ingolstadt (DE); Vladimir Idelevitch, Nuremberg (DE); Andreas Ottinger, Rain/Überacker (DE)

(73) Assignee: AUDI AG, Ingolstadt (DE)

( * ) Notice: Subject to any disclaimer, the term of this patent is extended or adjusted under 35 U.S.C. 154(b) by 121 days.

(21) Appl. No.: 16/237,908

(22) Filed: Jan. 2, 2019

(65) Prior Publication Data

US 2019/0245375 A1    Aug. 8, 2019

(30) Foreign Application Priority Data

Feb. 5, 2018    (DE) ................. 10 2018 201 691

(51) Int. Cl.
*H02J 7/14*    (2006.01)
*B60K 25/08*   (2006.01)
(Continued)

(52) U.S. Cl.
CPC .............. *H02J 7/1446* (2013.01); *B60K 1/04* (2013.01); *B60K 25/08* (2013.01); *B60L 7/10* (2013.01);
(Continued)

(58) Field of Classification Search
CPC .... H02J 7/1446; H02J 7/32; H02J 9/06; H02J 7/1415; H02J 2310/48; H02J 7/0042;
(Continued)

(56) References Cited

U.S. PATENT DOCUMENTS 5,086,857 A      2/1992  Dale
5,698,905 A *   12/1997  Ruthlein .................. B60K 6/26
                                                    290/32
(Continued)

FOREIGN PATENT DOCUMENTS

AT          513353 A1    3/2014
CN         206031072 U   3/2017
(Continued)

OTHER PUBLICATIONS

Extended European Search Report dated May 13, 2019, including the European Search Report and the European Search Opinion, in connection with corresponding EP Application No. 18201221.1 (13 pgs., including machine-generated English translation).
(Continued)

*Primary Examiner* — M Baye Diao
(74) *Attorney, Agent, or Firm* — Maier & Maier, PLLC

(57) ABSTRACT

A mobile emergency charging device for a battery of a motor vehicle that is designed to charge the battery in a recuperation operation. The mobile emergency charging device has at least one fuel tank, an internal combustion engine, and at least one drive roller for driving a wheel of the motor vehicle. This at least one drive roller is connected at least indirectly to an output shaft of the internal combustion engine and, by way of this connection, the drive roller is set into a rotational movement when the internal combustion engine is running.

10 Claims, 3 Drawing Sheets

(51) Int. Cl.
  *B60L 53/50* (2019.01)
  *H02J 7/32* (2006.01)
  *G01M 17/007* (2006.01)
  *B60L 50/61* (2019.01)
  *B60L 7/10* (2006.01)
  *B60L 53/36* (2019.01)
  *B60L 58/10* (2019.01)
  *H02J 9/06* (2006.01)
  *B60L 53/30* (2019.01)
  *B60L 7/20* (2006.01)
  *B60K 1/04* (2019.01)
  *H02K 7/18* (2006.01)
  *B60L 58/14* (2019.01)
  *B60L 53/24* (2019.01)

(52) U.S. Cl.
  CPC ............ *B60L 7/20* (2013.01); *B60L 50/61* (2019.02); *B60L 53/24* (2019.02); *B60L 53/30* (2019.02); *B60L 53/36* (2019.02); *B60L 53/50* (2019.02); *B60L 58/10* (2019.02); *B60L 58/14* (2019.02); *G01M 17/0072* (2013.01); *H02J 7/1415* (2013.01); *H02J 7/32* (2013.01); *H02J 9/06* (2013.01); *H02K 7/1861* (2013.01); *B60L 2240/547* (2013.01)

(58) Field of Classification Search
  CPC .. B60L 7/20; B60L 53/50; B60L 50/61; B60L 7/10; B60L 58/14; B60L 53/56; B60L 53/24; B60L 58/10; B60L 53/30; B60L 2240/547; B60K 1/04; B60K 25/08; H02K 7/1861; G01M 17/0072
  USPC ........................................................ 320/104
  See application file for complete search history.

(56) References Cited

U.S. PATENT DOCUMENTS

| | | | |
|---|---|---|---|
| 8,174,231 B2 | 5/2012 | Sandberg et al. | |
| 9,908,423 B2 * | 3/2018 | Bell | B60L 53/36 |
| 10,377,403 B2 * | 8/2019 | Lee | B62B 5/0053 |
| 10,461,552 B2 * | 10/2019 | Loewen | H02J 7/0042 |
| 10,703,401 B2 * | 7/2020 | Lee | B62B 5/0056 |
| 2008/0185196 A1 * | 8/2008 | Artioli | B60K 15/07 180/65.245 |
| 2013/0168969 A1 | 7/2013 | Markoski | |
| 2016/0325634 A1 | 11/2016 | Foldesi | |
| 2017/0341503 A1 * | 11/2017 | Idelevitch | B60K 7/0007 |
| 2020/0185952 A1 * | 6/2020 | Morrow | H02J 7/0027 |

FOREIGN PATENT DOCUMENTS

| | | |
|---|---|---|
| DE | 2 036 807 A1 | 1/1972 |
| DE | 8813662 U1 | 2/1989 |
| DE | 3825179 A1 | 2/1990 |
| DE | 4119266 A1 | 12/1992 |
| DE | 9313440 U1 | 8/1994 |
| DE | 4330322 A1 | 5/1995 |
| DE | 102 49 823 B3 | 6/2004 |
| DE | 10311732 A1 | 9/2004 |
| DE | 102010025002 A1 | 12/2011 |
| DE | 102010060341 A1 | 5/2012 |
| DE | 102011010785 A1 | 8/2012 |
| DE | 102011018457 A1 | 10/2012 |
| DE | 102016008028 A1 | 2/2017 |
| EP | 2 800 886 A2 | 11/2014 |
| WO | 2013/103542 A2 | 7/2013 |

OTHER PUBLICATIONS

Examination Report dated Jul. 31, 2018 in corresponding German Application No. 102018201691.7; 15 pages.
Examination Report dated Sep. 11, 2018 in corresponding German Application No. 102018201691.7; 11 pages.
Examination Report dated Jul. 6, 2020, in corresponding European patent application No. 18 201 221.1 including partial machine-generated English language translation, 11 pages.
German Examination Report dated Nov. 10, 2020, in connection with corresponding DE Application No. 10 2018 201 691.7 (20 pp. including machine-generated English translation).

\* cited by examiner

MOBILE EMERGENCY CHARGING DEVICE FOR A BATTERY OF A MOTOR VEHICLE, EMERGENCY CHARGING METHOD, AND MOTOR VEHICLE WITH A LIFTING MECHANISM

FIELD

The invention relates to a mobile emergency charging device for a battery of a motor vehicle, an emergency charging method for a battery of a motor vehicle, and a motor vehicle that has a battery and a lifting mechanism.

BACKGROUND

Various devices and methods already exist for the emergency charging or for general charging of a battery of a motor vehicle with an electric or a hybrid drive.

Described in DE 10 2016 008 028 A1, for example, is a mobile charging system for charging an electrical energy storage unit of a motor vehicle. Here, a mobile internal combustion engine operated with fuel is used to drive a generator device, which makes available the electrical power supplying the energy storage unit.

Also known are various methods and devices that, for charging a battery of a motor vehicle, exploit the fact that, in a recuperation mode of an electric drive unit of a motor vehicle, kinetic energy can be converted to electrical energy, as a result of which the battery of the motor vehicle can be charged. Such an energy recovery usually occurs during drive operation—for example, during braking or in overrun operation of the motor vehicle. However, when the motor vehicle is at a standstill, it is also possible to charge the battery in a recuperation operation of the motor vehicle by externally driving at least one of the wheels of the motor vehicle. Described in DE 10 2010 060 341 A1, for example, on the basis of this principle, is a roller test bench, which has drivable rollers embedded in the floor of the roller test bench and in which these rollers are used to set in motion a wheel of the motor vehicle for charging an electrical energy storage unit. Accordingly, this roller dynamometer represents a charging device for an energy storage unit of an electric vehicle or a hybrid vehicle.

Described in DE 10 2011 018 457 A1 is, in addition, a charging station in which a roller that is driven by an electric machine and is embedded in the floor of a stationary charging station is brought into contact with the running surface of at least one wheel of a motor vehicle in order to charge the battery of this motor vehicle in a recuperation mode of the motor vehicle. In this case, the drive device of this roller is supplied with energy from an electrical power supply and/or a hydraulically or pneumatically driven device.

Described in U.S. Pat. No. 8,174,231 B2 is a charging method for a motor vehicle in which the wheel of a stationary motor vehicle is likewise moved by a rotating roller in order to charge the battery of the motor vehicle in a recuperation mode. In this case, the roller is moved by using the wheels of another motor vehicle to set the roller in motion.

SUMMARY

The object of the invention is to make available a solution by means of which the battery of a motor vehicle can be charged at any time as much as possible.

This object is achieved by a mobile emergency charging device for a battery of a motor vehicle, an emergency charging method, and a motor vehicle with a battery and a lifting mechanism.

The mobile emergency charging device according to the invention for a battery of a motor vehicle is designed to charge the battery in a recuperation operation and is characterized in that the mobile emergency charging device has at least one fuel tank, an internal combustion engine, and at least one drive roller for driving a wheel of the motor vehicle. The at least one drive roller is at least indirectly connected to an output shaft of the internal combustion engine and is set into a rotational movement via this connection when the internal combustion engine is running. The drive roller can be positioned beneath one of the wheels of the motor vehicle in such a way that, by means of the rotating drive roller, the wheel in question is set into rotational movement when the internal combustion engine of the mobile emergency charging device is running and, as a result, the battery is charged in the recuperation operation of the motor vehicle.

Accordingly, the invention relates to a portable device for charging a motor vehicle battery, wherein the device is conceived for the purpose of being utilized particularly in an emergency, that is, in the case of a relatively strongly discharged battery. This emergency charging device is suitable for a motor vehicle that is equipped with a mode in which, at least through movement of one of the wheels of the motor vehicle, the kinetic energy of this wheel movement is converted to electrical energy and can be used for charging the battery of the motor vehicle. The emergency charging device is therefore designed for a motor vehicle that is equipped with a recuperation mode.

The mobile emergency charging device has at least one tank for fuel, a motor that can be driven using this fuel, and a cylindrical rotatable component, the so-called drive roller. This drive roller can be used to drive, that is, to set in motion, at least one of the wheels of the motor vehicle if this drive roller has been positioned beneath this wheel. The drive roller itself is driven by a movement of the internal combustion engine and, namely, driven by way of an intermediate component, the output shaft of the engine, the rotational movement of which is indirectly transmitted onto the drive roller, for example, by use of a gearing connected between the output shaft and the drive roller.

If the drive roller is situated beneath one of the wheels of the motor vehicle and if the internal combustion engine is switched on, the rotational movement of the drive roller sets the corresponding wheel likewise into a rotational movement and, ultimately by use of the recuperation mode of the motor vehicle, thereby charges the battery of the motor vehicle with electrical energy. Accordingly, the mobile emergency charging device utilizes the devices and systems that already exist in the motor vehicle for generating energy for charging the battery. This is possible because the corresponding devices and systems in the motor vehicle are already equipped with intermediate storage units, inverters, and supply cables.

If, for example, an electric or a hybrid vehicle finds itself in the situation that the battery of the vehicle is nearly discharged and, in addition, in the case of the hybrid vehicle, the fuel tank for an internal combustion engine of the vehicle is empty, the mobile emergency charging device can be utilized to charge once again, at least partially, the battery of the motor vehicle. For this purpose, the motor vehicle is switched to a kind of emergency charging mode and the emergency charging device is positioned below one of the driven wheels of an axle of the motor vehicle. This positioning is conducted manually by a user of the motor vehicle. The emergency charging mode of the motor vehicle comprises the fact that, during a movement of at least one of the wheels of the motor vehicle, the battery can be charged in the recuperation operation of the motor vehicle. The emergency charging device positioned below the wheel of the motor vehicle has a fuel tank, which, for example, is filled with 1 to 2 liters of ethanol or gasoline, as well as an internal combustion engine, such as, for example, a two-stroke engine. By use of this engine, when the mobile emergency charging device is started up, a drive roller is then set in motion in such a way that, if a wheel of the motor vehicle is positioned above the drive roller in such a way that the drive roller and the wheel of the motor vehicle are in physical contact, the drive roller sets the wheel of the motor vehicle in motion. Subsequently, depending on the size of the fuel tank and depending on the engine power, within a period of usually 30 minutes, the battery of the motor vehicle is charged with sufficient electrical energy in the recuperation operation so that the motor vehicle can usually travel a further 30 to 50 kilometers. By use of the mobile emergency charging device, therefore, the battery of the motor vehicle can be sufficiently charged in order that the motor vehicle can move on its own to the nearest stationary charging station for electric or hybrid vehicles.

Accordingly, by means of the mobile emergency charging device proposed in accordance with the invention for a battery of a motor vehicle, it is possible to use the recuperation operation of a motor vehicle to supply the battery of the motor vehicle with sufficient energy to increase the range of travel of the motor vehicle in such a way that the motor vehicle can move to a charging station or, in the case of a hybrid vehicle, to a gas station. The mobile charging device can be dimensioned in such a way that it can be stored, together with a spare tire of the motor vehicle, in the spare tire well of the motor vehicle when it is not needed. Accordingly, the emergency charging device can be transported with very little effort during each trip of the motor vehicle.

In another advantageous embodiment of the invention, it is provided that the mobile emergency charging device has a rotatably mounted bearing roller, with the respective rotational axes of the bearing roller and the drive roller extending parallel to each other, so that the respective wheel of the motor vehicle rolls in the recuperation operation in part between the drive roller and the bearing roller that is arranged at the latter. Accordingly, the mobile emergency charging device has a total of two rotatably mounted rollers. These rollers are referred to as a drive roller and a bearing roller and are arranged in relation to each other in such a way that their longitudinal axes lie parallel to each other. A wheel of the motor vehicle can then be positioned between the two rollers in such a way that the two rollers clamp the wheel and accordingly stabilize the motor vehicle via the mobile emergency charging device. The wheel of the motor vehicle is therefore set in motion via the drive roller that is set into rotation by the running internal combustion engine. This rotational movement of the wheel is transmitted, in turn, onto the bearing roller, so that, ultimately, both rollers are set in motion. Accordingly, by use of the two rollers of the emergency charging device, the wheel of the motor vehicle can be fixed in place especially stably and securely via the mobile emergency charging device, while the battery is charged by the rotational movement of the wheel in the recuperation operation.

In another advantageous embodiment of the invention, it is provided that the distance between the rotational axes can be varied for different wheel diameters. Accordingly, the distance between the drive roller and the bearing roller can be adjusted depending on the diameter of a wheel of the motor vehicle. If the mobile emergency charging device has a housing, for example, which has at least two outer walls arranged parallel to each other, then the drive roller can be adjusted at a fixed position between these two housing walls. The housing walls have, in addition, a plurality of locking points for the bearing roller, these points being placed at fixed defined distances. These locking points are chosen to be at such distances from the drive roller that, ultimately, the distance between the two rollers is matched to the diameter of commercially available motor vehicle wheels. Accordingly, it is possible to adjust the bearing roller within the housing of the mobile emergency charging device in such a way that wheels of varying diameter can be positioned stably and securely via the emergency charging device. As locking points, for example, recesses in the housing walls are possible, into which pins projecting from the two ends of the bearing roller can be pressed. Accordingly, the mobile emergency charging device can be used for motor vehicles with various kinds of tires and the respective kinds of tires of the wheels of the motor vehicle can be adapted on site and with relatively little effort.

In another advantageous embodiment of the invention, it is provided that the internal combustion engine and the fuel tank are integrated in the drive roller. Accordingly, it is provided that both the fuel tank and the internal combustion engine are arranged directly at or inside of the roller and accordingly are not accessible to the user of the motor vehicle. These two component parts of the emergency charging device can be fastened in position, for example, at one of the ends of the drive roller and are situated directly at the housing of the emergency charging device. This arrangement of the internal combustion engine and of the fuel tank inside of or directly at the drive roller make possible an especially safe handling of the emergency charging device by the users of the motor vehicle, because neither the internal combustion engine nor the fuel tank is arranged in a directly accessible manner for the user.

In another advantageous embodiment of the invention, it is provided that the fuel tank can be exchanged. Accordingly, the fuel tank, that is, the tank for the fuel for the motor of the emergency charging device, can be removed and replaced. This makes it possible either to replace a fuel tank that has been removed by a new fuel tank or to refill the fuel tank that has been removed. Alternatively to this, it is possible to use a fuel tank that is provided for only a single use and accordingly cannot be exchanged. This would mean that the mobile emergency charging device can be used only one time. An exchangeable fuel tank has the advantage that the mobile emergency charging device can then be used several times to recharge the battery of the motor vehicle in an emergency situation, that is, in the case of a nearly discharged battery, in the recuperation operation of the motor vehicle.

In another advantageous embodiment of the invention, it is provided that, between the drive roller and the output shaft of the internal combustion engine, a gearing is connected. Accordingly, the drive roller and the output shaft of the internal combustion engine are not in direct contact with each other. In this case, the gearing between the drive roller and the output shaft of the internal combustion engine may have a plurality of gear steps. The output shaft of the internal combustion engine can, for example, drive a first gearwheel of the gearing, which, in turn, sets the inward toothed inner wall of the drive roller in motion by way of additional gear steps. The gearing can be, in general, a shaft gearing or a directly toothed gearing.

The intermediate connection of a gearing makes it possible for the rotational movement of the internal combustion engine, which usually is 5000 to 8000 revolutions per minute, to lead, through a corresponding gearing with usually one to six gear steps, to a rotational movement of the drive roller, which leads to a rotational movement of the wheel of the motor vehicle of about two to three revolutions per second. Accordingly, by use of the gearing, an especially appropriate conversion of the movement of the internal combustion engine to the movement of the drive roller and, accordingly, ultimately to the movement of the wheel of the motor vehicle for charging the battery of the motor vehicle in the recuperation operation is possible.

In accordance with the invention, in addition, an emergency charging method for a battery of a motor vehicle is provided by means of a mobile emergency charging device, as has been described above, for which a drive roller of the emergency charging device is positioned beneath one of the wheels of the motor vehicle, the wheel in question is set into a rotational movement by means of the rotating drive roller when the internal combustion engine of the mobile emergency charging device is running, and the battery is thereby charged in the recuperation operation of the motor vehicle. In the scope of this emergency charging method for a motor vehicle battery, therefore, a rotatably mounted component of the above-described emergency charging device, that is, the drive roller thereof, is arranged beneath one of the wheels of the motor vehicle in such a way that, as soon as the internal combustion engine of the mobile emergency charging device is switched on, the rotational movement of the drive roller sets the wheel in question likewise into a rotational movement, as a result of which the battery of the motor vehicle is charged in the recuperation operation of the motor vehicle. Accordingly, by use of this emergency charging method, it is possible to increase the remaining range of travel of an electric or a hybrid vehicle by use of the above-described mobile emergency charging device for a battery of a motor vehicle.

In another advantageous embodiment of the invention, it is provided that, in the scope of the emergency charging method, when a state of charge of the battery has dropped below a lower charge limit, a control unit of the motor vehicle alerts a user of the motor vehicle with a predetermined warning signal to position the mobile emergency charging device. By means of a component of the motor vehicle provided for this purpose, therefore, the state of charge of the battery is recorded. As soon as a predetermined lower limit value of the battery charge is determined by this component, the component transmits a corresponding signal to a user of the motor vehicle. This signal alerts the user that, on account of the state of charge of the battery, it would be appropriate to use the mobile emergency charging device, that is, to position it under a wheel of the motor vehicle. This control unit, that is, the component that is designed to transmit this warning signal and to alert the user to position the emergency charging device, can be a component part of the battery of the motor vehicle. This has the advantage that, in this case, the emergency charging method can be carried out independently of the vehicle and, accordingly, it is not necessary to resort to other systems of the motor vehicle. However, it is also possible that the control unit is not integrated directly in the battery. In this case, the function of the control unit does not depend on the state of charge of the battery, which is advantageous, in particular, in the case of a nearly completely discharged battery in an emergency situation.

The warning signal can be, for example, a warning lamp in the region of the driver cockpit of the motor vehicle. This warning signal can be associated with an optical indication on a display in the interior of the vehicle, on which, by using a symbol or a text message, the user of the motor vehicle is alerted to position the emergency charging device beneath one of the wheels of the motor vehicle. On this display, it is possible, in addition, to display instructions for reaching a stopping place, as well as for positioning the emergency charging device. The display can, in addition, contain information about which wheel of the motor vehicle is suited especially advantageously for the emergency charging method using the mobile emergency charging device. For the determination of this wheel of the motor vehicle, it is possible to take into consideration, for example, environmental data of corresponding sensor devices of the motor vehicle, which have available to them information about the roadway surface conditions in the region of the current position of the motor vehicle. Alternatively or additionally to an optical warning signal, it is also possible to use an acoustic warning signal in the scope of the emergency charging method. A user of the motor vehicle therefore receives detailed and readily comprehensible information as to when and how to position the emergency charging device in the case of an emergency.

In another advantageous embodiment of the emergency charging method proposed in accordance with the invention, it is provided that an active chassis of the motor vehicle lifts the wheel in question far enough that the emergency charging device can be positioned under the wheel, with the active chassis system lowering the wheel in question onto the drive roller of the emergency charging device after the emergency charging device has been positioned. In order to position the mobile emergency charging device under a wheel of the motor vehicle, it is also possible for the corresponding wheel to be lifted from the ground by use of a component of the motor vehicle. After the wheel has been lifted off of the ground and the emergency charging device has been positioned beneath the wheel by the user of the motor vehicle, the motor vehicle is lowered back down using this component of the motor vehicle in such a way that the wheel is positioned directly above the drive roller of the emergency charging device. Accordingly, the raising and the lowering is carried out by an active chassis system, that is, by a corresponding component of the motor vehicle. If the motor vehicle is equipped with such an active chassis system, therefore, the user of the motor vehicle only needs to take the mobile emergency charging device from its storage location inside the motor vehicle and place it on the ground beneath the pertinent wheel of the motor vehicle. By use of an active chassis system of the motor vehicle, therefore, it is possible in an especially advantageous manner and with relatively little effort to carry out the positioning of the mobile emergency charging device beneath a wheel of the motor vehicle.

Alternatively to this, it is possible for the user of the motor vehicle himself to lift the motor vehicle in the region of the wheel in question and lower it onto the emergency charging device positioned by him—for example, by use of a car jack. In addition, it is possible for the user of the motor vehicle initially to position the mobile emergency charging device on the ground in the vicinity of one of the wheels of the motor vehicle and subsequently to drive the motor vehicle onto the mobile charging device. This driving onto the emergency charging device or, strictly speaking, onto the drive rollers of the emergency charging device may take place through a manual driving operation by the user or through activation of an at least partially automatic driver assistance function.

Provided in accordance with the invention is, in addition, a motor vehicle that has a battery and is designed to charge the battery in a recuperation operation, with the motor vehicle having a lifting mechanism, which is designed to increase the distance between at least one wheel of the motor vehicle and an undersurface far enough that the emergency charging device can be positioned between the wheel and the undersurface. Accordingly, the motor vehicle with a battery is equipped with a recuperation mode, which can be used for the purpose of using the movement of at least one wheel of the motor vehicle to convert the kinetic energy of the wheel movement to electrical energy and for charging the battery of the motor vehicle. In addition, for this purpose, the motor vehicle is capable of lifting at least one of its four wheels far enough that, between this wheel and the ground beneath the motor vehicle, the above-described emergency charging device for a battery of a motor vehicle can be positioned. This lifting mechanism of the motor vehicle may involve, for example, the above-mentioned active chassis system of a motor vehicle.

It is also possible, however, for the motor vehicle to have an integrated car jack, which, for example, is fastened to the bottom side of the motor vehicle and, in this situation or, for example, for changing a tire, can be extended by use of a control unit of the motor vehicle that is designed for this purpose and can lift the motor vehicle in the region of at least one of the wheels of the motor vehicle far enough from the ground that the mobile emergency charging device can be positioned between the wheel and the ground. Through a lifting mechanism that is installed in the motor vehicle, the mobile emergency charging device can be positioned in an emergency situation especially advantageously and with little effort.

The invention also comprises combinations of the described embodiments.

The invention also includes enhancements of the method according to the invention that have features such as those already described in connection with the enhancements of the motor vehicle according to the invention. For this reason, the corresponding enhancements of the method according to the invention are not described here once again.

BRIEF DESCRIPTION OF THE DRAWINGS

Exemplary embodiments of the invention are described below. Shown herein for this purpose are.

DETAILED DESCRIPTION

In the exemplary embodiments explained below, what is involved are preferred embodiments of the invention. In the exemplary embodiments, the described components of the embodiment each represent individual features, which are to be regarded as independent of one another and each of which further develops the invention also independently of one another, and, accordingly, which are also to be regarded individually or in a combination different from that shown as being a part of the invention. Furthermore, the described embodiments can also be supplemented by features that are additional to those already described.

In the figures, functionally identical elements are each furnished with the same reference numbers.

Figure 1:
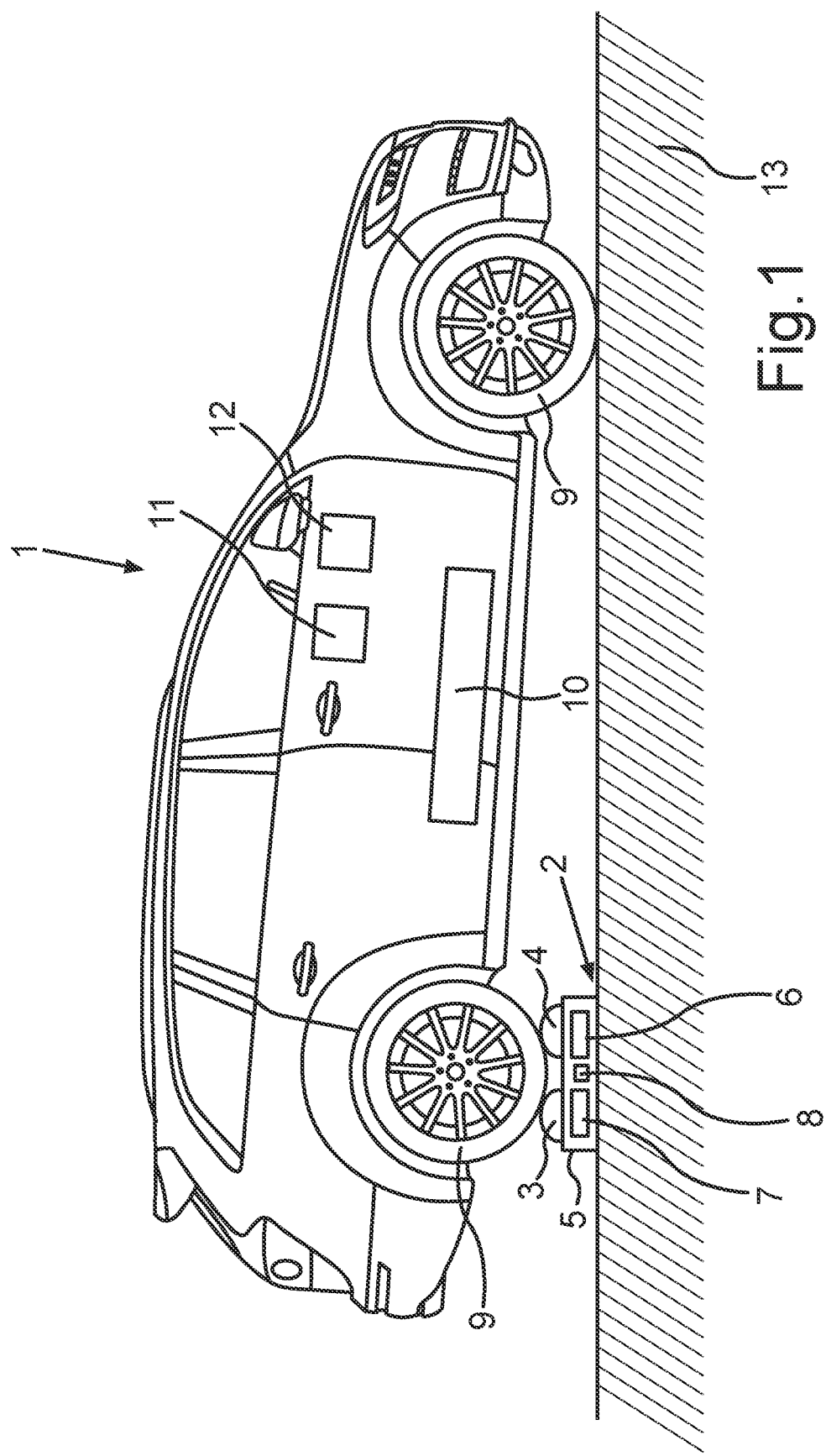
FIG. 1 a schematic illustration of a motor vehicle with a battery that is being charged in a recuperation mode by means of a mobile emergency charging device.

Drawn schematically in FIG. 1 is a motor vehicle 1, which has a battery 10. Accordingly, the motor vehicle 1 is an electric vehicle or a hybrid vehicle. During a drive of the motor vehicle 1, a battery control unit 11 of the motor vehicle 1 determines that the current state of charge of the battery 10 has dropped below a lower charge limit. Subsequently, on a display unit 12 in the interior of the vehicle, a predetermined warning signal alerts a user of the motor vehicle 1 about the current state of charge of the battery 10. This warning signal is, for example, a flashing light signal as well an indication on a screen of the display unit 12. With the help of this indication, the user of the motor vehicle 1 is alerted that the motor vehicle 1 needs to be stopped and a mobile emergency charging device 2 for charging the battery 10 of the motor vehicle 1 needs to be positioned. Once the user of the motor vehicle 1 has subsequently braked the motor vehicle 1 and brought it to a standstill, the motor vehicle 1 switches to an emergency mode, in which, when at least one of the wheels 9 of the motor vehicle 1 is in motion, the battery 10 can be recharged in a recuperation operation.

The emergency charging device 2 has a drive roller 3, a bearing roller 4, a housing 5, a fuel tank 6, an internal combustion engine 7, and a gearing 8. The individual components of the emergency charging device 2 are drawn only schematically in FIG. 1 and do not represent the actual arrangement of the individual components of the emergency charging device 2. In order to use this mobile emergency charging device 2 to charge the battery 10 of the motor vehicle 1 in a recuperation operation, the emergency charging device 2 has to be positioned beneath one of the wheels 9 of the motor vehicle 1 by the user of the motor vehicle 1. For this purpose, the corresponding wheel 9—in this case, the right rear wheel—initially has to be lifted.

The lifting of the motor vehicle 1 in the region of the corresponding wheel 9 can be conducted with the help of various lifting methods. For example, the driver can lift the motor vehicle 1 in this region manually by using a car jack. It is also possible initially to place the emergency charging device 2 on an undersurface 13 in the vicinity of the corresponding wheel 9 and then to drive or have the motor vehicle 1 driven manually or in an at least partially autonomous driving operation onto the emergency charging device 2. Alternatively to this, it is possible for the motor vehicle 1 to be equipped with an active chassis system that lifts the corresponding wheel 9 far enough from the undersurface 13 that the emergency charging device 2 can be placed in the gap between the wheel 9 and the undersurface 13. Furthermore, it is possible that a car jack is integrated in the motor vehicle 1, and, for example, is fastened at the underside of the motor vehicle 1, and is extended under the control of a corresponding control unit of the motor vehicle 1 in such a way that, in the region of the corresponding wheel 9, the motor vehicle 1 is lifted sufficiently far from the undersurface 13 in order that the user of the motor vehicle 1 can position the emergency charging device 2 beneath the corresponding wheel 9.

After the emergency charging device 2 has been positioned, the corresponding wheel 9 of the motor vehicle 1 is situated above the drive roller 3 and the bearing roller 4. These two rollers 3 and 4 hold the wheel 9 in a specific position, so that the motor vehicle 1 does not move away from the emergency charging device 2 once the internal combustion engine 7 is started. The drive roller 3 and the bearing roller 4 are placed rotatably at the outer walls of the housing 5. In this case, the drive roller 3 is fastened with its two ends at a predetermined position. The bearing roller 4 can be arranged at a plurality of positions in the housing 5 in that it is fastened at various distances parallel to the drive roller 3 at predetermined locking points on the housing 5 of the emergency charging device 2. In this way, it is possible for the distance at which the two rollers 3 and 4 of the emergency charging device 2 are arranged in the housing 5 with respect to each other to be matched to a diameter of the wheel 9 of the motor vehicle 1. On the inner side of the housing 5, therefore, at two opposite-lying walls of the housing 5, there are corresponding locking points to which the bearing roller 4 can be fastened. These locking points may involve, for example, recesses in the walls of the housing 5, into which the bearing roller 4 can be pressed using pin projections provided for this purpose. Accordingly, this adaptable arrangement of the bearing roller 4 makes it possible that with one and the same emergency charging device 2, different motor vehicles 1 having wheels 9 of different diameters can be supplied with energy for the battery 10 in the case of an emergency.

Figure 2:
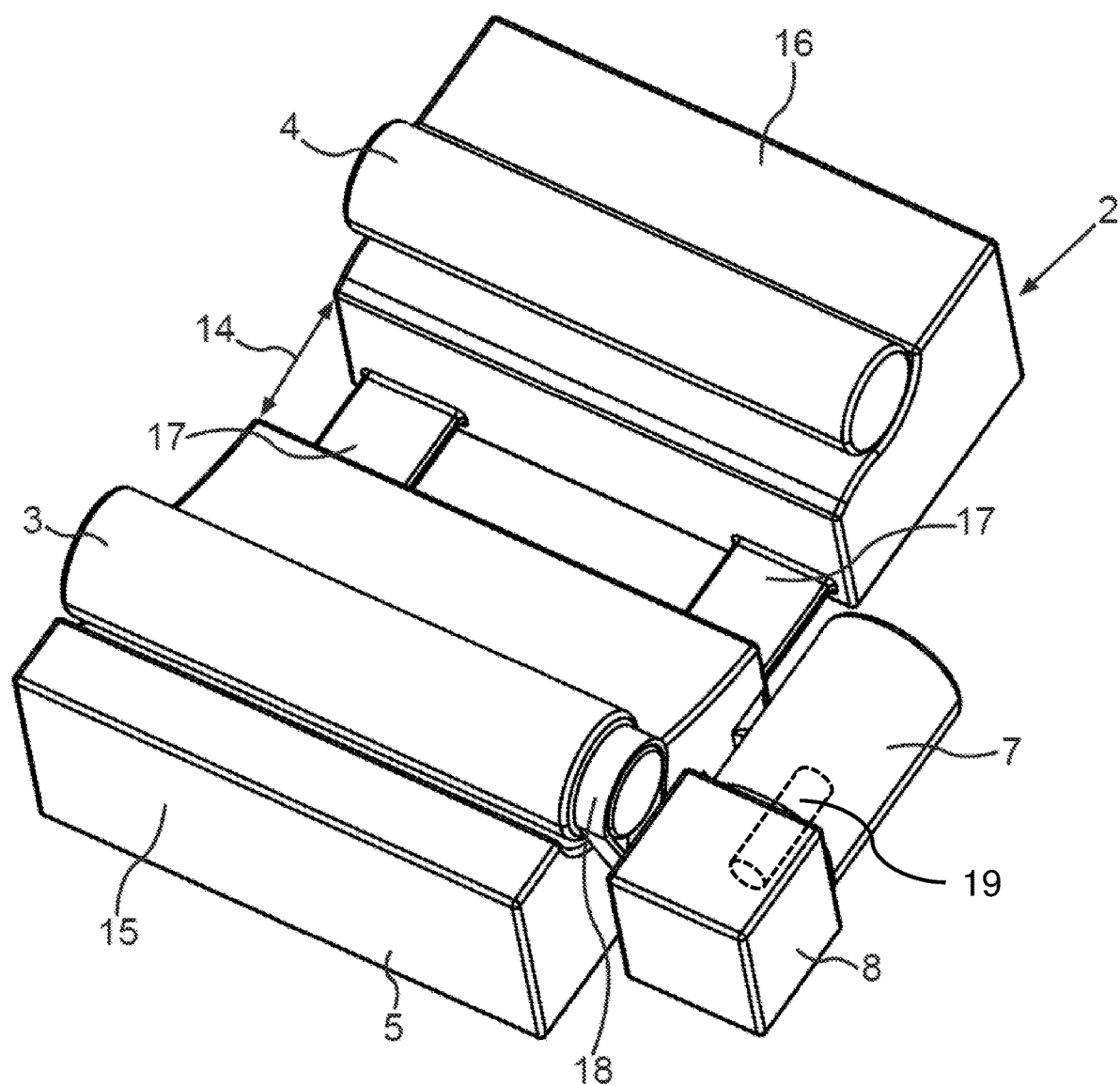
FIG. 2 a schematic illustration of the mobile emergency charging device.

Drawn schematically in FIG. 2 is the emergency charging device 2 with an alternative arrangement of the two rollers 3 and 4. The drive roller 3 and the bearing roller 4 in this arrangement are mounted rotatably on the housing part 15 or on the housing part 16. The distance between the two housing parts 15 and 16, marked by a double-pointed arrow 14, is adjusted with the help of two rails 17. These rails 17 can be pulled apart or pushed together and thereby changed in terms of their length in such a way that predetermined distances between the two housing parts 15 and 16 and accordingly between the rotational axes of the two rollers 3 and 4 can be adjusted. Through this adjustable arrangement of the two rollers 3 and 4 with respect to each other, it is likewise possible that with one and the same emergency charging device 2, different motor vehicles 1 having wheels 9 of different diameters can be supplied with energy for the battery 10 in the case of an emergency.

Figure 3:
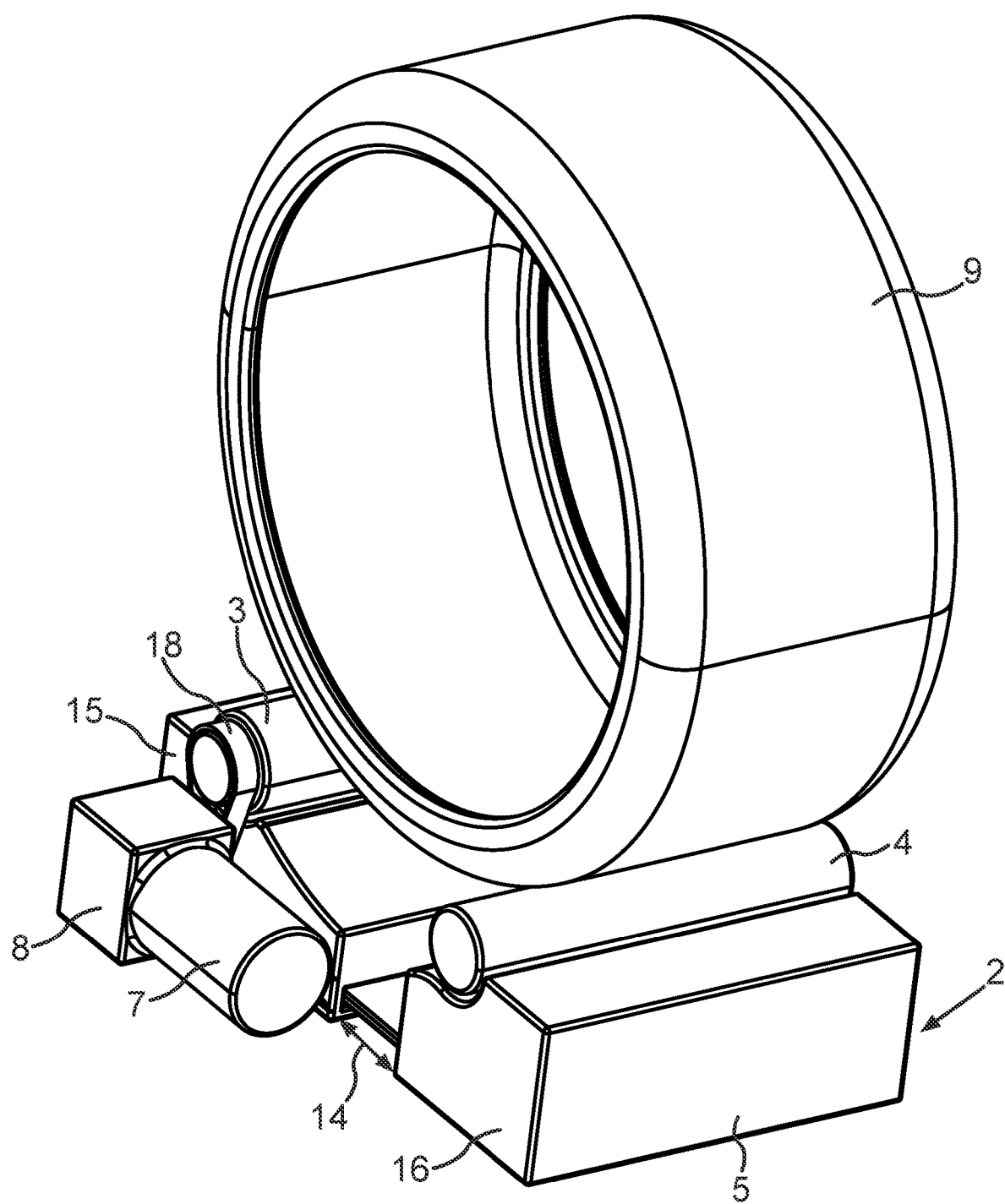
FIG. 3 a schematic illustration of the mobile emergency charging device, by way of which a wheel of the motor vehicle is positioned.

For clarification of the use of the emergency charging device 2 drawn schematically in FIG. 2, the latter is drawn schematically in FIG. 3 with a wheel 9 of the motor vehicle 1 positioned over the emergency charging device 2.

With the help of the fuel tank 6 (see FIG. 1), the internal combustion engine 7 is supplied with fuel, such as, for example, with gasoline or ethanol. Once the internal combustion engine 7 is switched on, the movement thereof is transmitted further to the drive roller 3 with the help of an output shaft 19 and the gearing 8. When the internal combustion engine 7 is running, therefore, the drive roller 3 of the emergency charging device 2 is set into rotational movement. This rotational movement sets the corresponding wheel 9 of the motor vehicle 1 likewise into a rotational movement. Subsequently, on account of the rotational movement of the wheel 9, the bearing roller 4 is also set into rotational movement. The rotational movement of the wheel 9 of the motor vehicle 1 can ultimately be used for the purpose of charging the battery 10 of the motor vehicle 1 in the recuperation operation of the motor vehicle 1.

If the emergency charging device 2 is equipped, for example, with a fuel tank 6 containing one to two liters of gasoline, it is possible in a period of usually 30 minutes with the help of the mobile emergency charging device 2 to recharge the battery 10 of the motor vehicle 1 far enough that the motor vehicle 1 can travel a further 30 to 50 kilometers. Accordingly, the emergency charging device 2 makes it possible for the motor vehicle 1 to travel on its own to a charging station located in the vicinity or, in the case of a hybrid vehicle, to travel further to the nearest gas station.

With the help of the gearing 8, an especially advantageous conversion of the motor movement, that is, the movement of the internal combustion engine 7, to the movement of the drive roller 3 and, accordingly, to the movement of the corresponding wheel 9 of the motor vehicle 1 is possible. If, for example, the internal combustion engine 7, which can be a two-stroke engine, is operated in such a way that it performs about 5000 to 8000 revolutions per minute, it is possible to use the gearing with one to usually six gear steps to convert this rotational movement to a rotational movement of the wheel 9 of two to three revolutions per second. In this speed range, an especially advantageous charging of the battery 10 is possible in the recuperation operation of the motor vehicle 1.

In the emergency charging device 2 drawn schematically in FIG. 2 and FIG. 3, the conversion of the rotational movement of the internal combustion engine 7 to that of the drive roller 3 takes place by way of the gearing 8 as well as via an additional belt drive 18. The belt drive 18 makes possible an especially easy maintenance of the emergency charging device, because no lubrication is necessary, and it is characterized by, among other things, an ability to sustain brief overloads. The use of the belt drive 18 therefore makes possible an especially advantageous conversion of the rotational movement inside the emergency charging device 2.

Alternatively to the emergency charging devices 2 drawn schematically here, both the fuel tank 6 and the internal combustion engine 7 and the gearing 8 can also be integrated in the drive roller 3. For example, they can be arranged in a cavity in the interior of the drive roller 3 and fastened to a wall of the housing 5. In addition, depending on the embodiment of the motor vehicle 1, the battery control unit 11 can be a component part of the battery 10. However, it is also possible for the battery control unit 11 to involve a general control unit of the motor vehicle 1, which, accordingly, can also be used for other applications.

The emergency charging device 2 is designed in terms of its dimensions in such a way that it can be stored, together with a spare tire of the motor vehicle 1, in the spare tire well of the motor vehicle 1, for example. In this way, it is possible for the mobile emergency charging device 2 to be brought along during each drive of the motor vehicle 1 and can be used in a corresponding emergency, that is, in the case of a battery state in which the battery 10 is not completely discharged, but nonetheless only has the capacity to cover a relatively small remaining range of travel. Moreover, the emergency charging device 2 is equipped with an exchangeable fuel tank 6, so that it can be reused after a single use, once the fuel tank 6 has been exchanged or refilled. However, the emergency charging device 2 may also be a device that can be used only one time. In this case, the fuel tank 6 cannot be exchanged, for which reason the emergency charging device 2 can no longer be used after a single use or once the fuel in tank 6 has been consumed.

Overall, the examples show that, by means of the emergency charging device 2, it is possible to charge the battery 10 of a motor vehicle 1 by use of the recuperation operation of the motor vehicle 1. For this purpose, the fact is exploited that, by means of the drive roller 3 of the emergency charging device 2, one of the wheels 9 of the motor vehicle 1 is set into a rotational movement and the thereby resulting kinetic energy can be converted to electrical energy, as a result of which the battery 10 is charged. Owing to the relatively high energy content of liquid fuels, such as, for example, ethanol or gasoline, an adequate energy transfer is achieved in the scope of operation of the emergency charging device 2 in spite of frictional losses and an efficiency of the electrical drive that is less than 1. The remaining range of travel of the motor vehicle 1 can therefore be sufficiently increased with the help of the mobile emergency charging device 2 so that, after it has been charged using the emergency charging device 2, the motor vehicle 1 can be driven to the nearest charging station.

The invention claimed is:

1. A mobile emergency charging device for a battery of a motor vehicle that is designed to charge the battery in a recuperation operation, comprising:
    at least one fuel tank, an internal combustion engine, and at least one drive roller for driving a wheel of the motor vehicle;
    the at least one drive roller is connected at least indirectly to an output shaft of the internal combustion engine and is set into a rotational movement by way of this connection when the internal combustion engine is running;
    the drive roller can be positioned beneath one of the wheels of the motor vehicle in such a way that, by the rotating drive roller, when the internal combustion engine of the mobile emergency charging device is running, the wheel in question is set into a rotational movement, and the battery is thereby charged in the recuperation operation of the motor vehicle.

2. The mobile emergency charging device according to claim 1, wherein the mobile emergency charging device has a rotatably mounted bearing roller, wherein the respective rotational axes of the bearing roller and the drive roller extend parallel to each other, so that, in the recuperation operation, the pertinent wheel of the motor vehicle is arranged in part between the drive roller and the bearing roller and rolls at these rollers.

3. The mobile emergency charging device according to claim 2, wherein the distance between the rotational axes can be varied for different wheel diameters.

4. The mobile emergency charging device according to claim 1, wherein the internal combustion engine and the fuel tank are integrated in the drive roller.

5. The mobile emergency charging device according to claim 1, wherein the fuel tank can be exchanged.

6. The mobile emergency charging device according to claim 1, wherein a gearing is intermediately connected between the drive roller and the output shaft of the internal combustion engine.

7. An emergency charging method for a battery of a motor vehicle by a mobile emergency charging device according to claim 1, in which a drive roller of the mobile emergency charging device is positioned beneath one of the wheels of the motor vehicle, the wheel in question is set into a rotational movement by means of the rotating drive roller when the internal combustion engine of the mobile emergency charging device is running, and the battery is thereby charged in the recuperation operation of the motor vehicle.

8. The emergency charging method according to claim 7, wherein,
    when a state of charge the battery has dropped below a lower charge limit, a control unit of the motor vehicle alerts a user of the motor vehicle with a predetermined warning signal to position the mobile emergency charging device.

9. The emergency charging method according to claim 7, wherein an active chassis system of the motor vehicle lifts the wheel in question far enough that the mobile emergency charging device can be positioned below the wheel, wherein, after the mobile emergency charging device has been positioned, the active chassis system lowers the wheel in question onto the drive roller of the mobile emergency charging device.

10. A motor vehicle having a battery, which is designed for the purpose of charging the battery in a recuperation operation,
    wherein the motor vehicle has a lifting mechanism, which is designed to increase the distance between at least one wheel of the motor vehicle and an undersurface far enough that a mobile emergency charging device can be positioned between the at least one wheel and the undersurface,
    wherein the mobile emergency charging device comprises at least one fuel tank, an internal combustion engine, and at least one drive roller for driving the at least one wheel of the motor vehicle,
    wherein the at least one drive roller is connected at least indirectly to an output shaft of the internal combustion engine and is set into a rotational movement by way of this connection when the internal combustion engine is running,
    wherein, when the mobile emergency charging device is positioned between the at least one wheel and the undersurface and when the internal combustion engine of the mobile emergency charging device is running, the wheel in question is set into a rotational movement by the rotational movement of the drive roller, and the battery is thereby charged in the recuperation operation of the motor vehicle.

* * * * *